Figure 1:
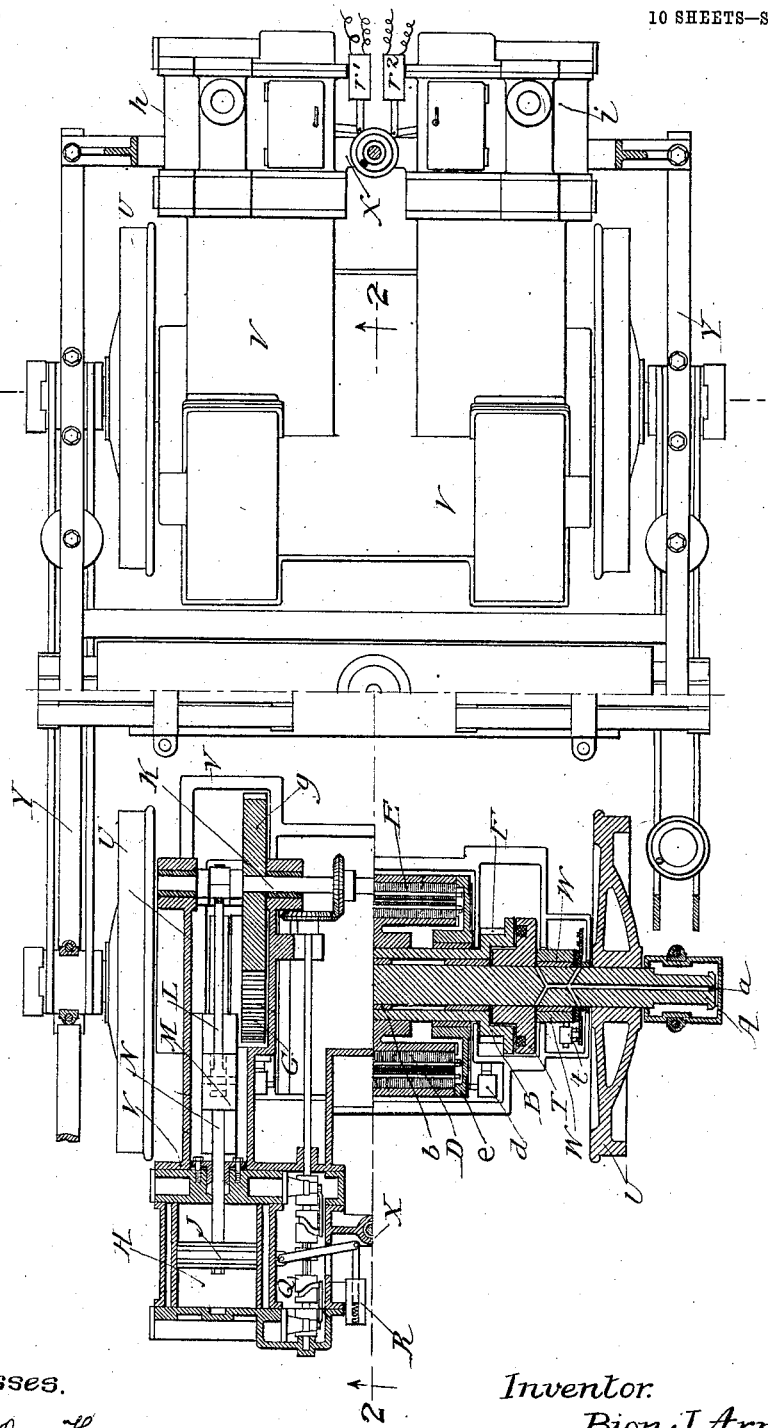

No. 759,223. PATENTED MAY 10, 1904.
B. J. ARNOLD.
POWER TRANSMISSION MECHANISM.
APPLICATION FILED APR. 26, 1901.
NO MODEL. 10 SHEETS—SHEET 1.

Witnesses.
W. Owen Thomas
Max W. Zabel.

Inventor.
Bion J. Arnold.
By Charles A. Brown Cragg Orfield
Attorneys.

No. 759,223. PATENTED MAY 10, 1904.
B. J. ARNOLD.
POWER TRANSMISSION MECHANISM.
APPLICATION FILED APR. 26, 1901.
NO MODEL. 10 SHEETS—SHEET 3.

Witnesses.
W. Owen Thomas
Max W. Zabel

Inventor.
Bion J. Arnold.
By Charles A. Brown Cragg & Bepield
Attorneys.

No. 759,223. PATENTED MAY 10, 1904.
B. J. ARNOLD.
POWER TRANSMISSION MECHANISM.
APPLICATION FILED APR. 26, 1901.
NO MODEL. 10 SHEETS—SHEET 4.

Witnesses. Inventor.
Bion J. Arnold.
By Charles A. Brown Cragg Belfield
Attorneys.

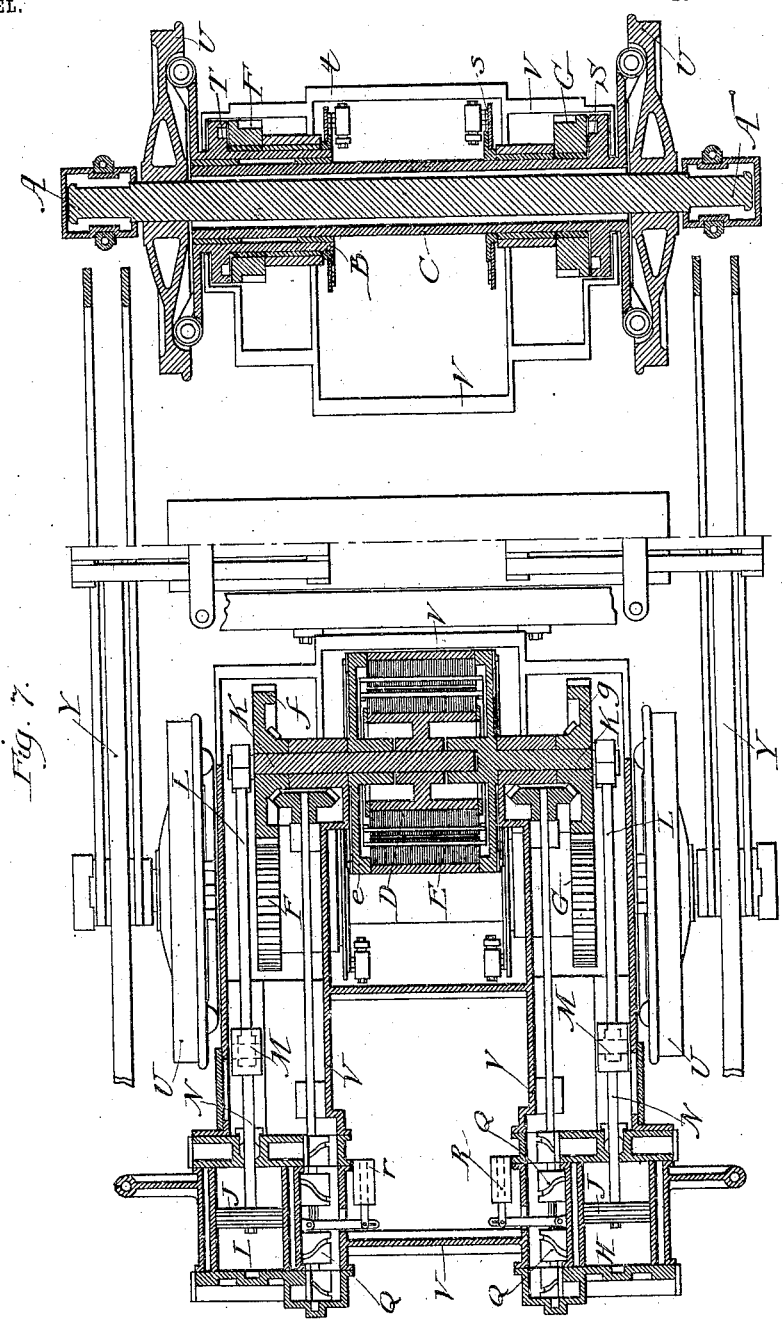

No. 759,223. PATENTED MAY 10, 1904.
B. J. ARNOLD.
POWER TRANSMISSION MECHANISM.
APPLICATION FILED APR. 26, 1901.
NO MODEL. 10 SHEETS—SHEET 6.
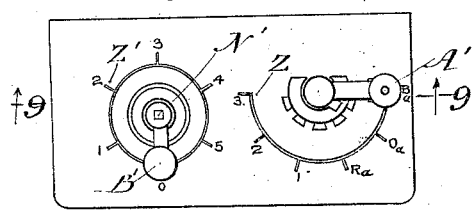
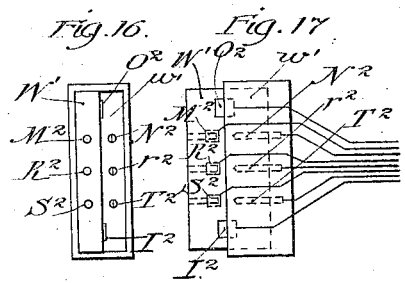
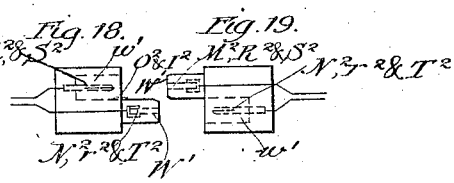
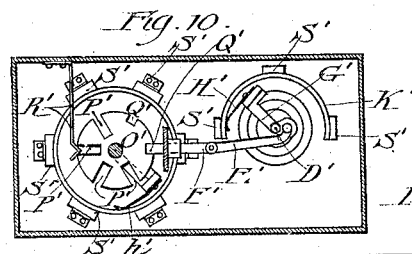
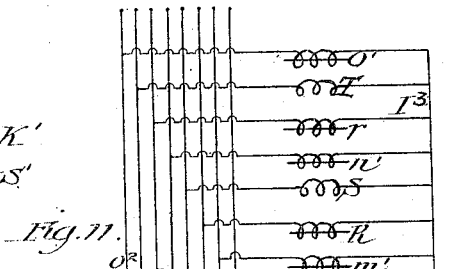
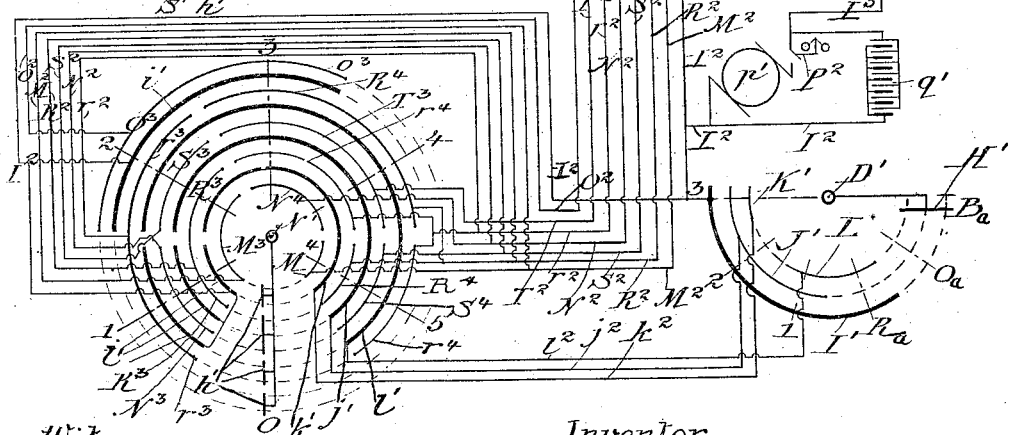
Witnesses.
W. Owen Thomas
May W. Zabel
Inventor.
Bion J. Arnold.
By Charles A. Brown Cragg & Brefield
Attorneys.

No. 759,223. PATENTED MAY 10, 1904.
B. J. ARNOLD.
POWER TRANSMISSION MECHANISM.
APPLICATION FILED APR. 26, 1901.
NO MODEL. 10 SHEETS—SHEET 7.
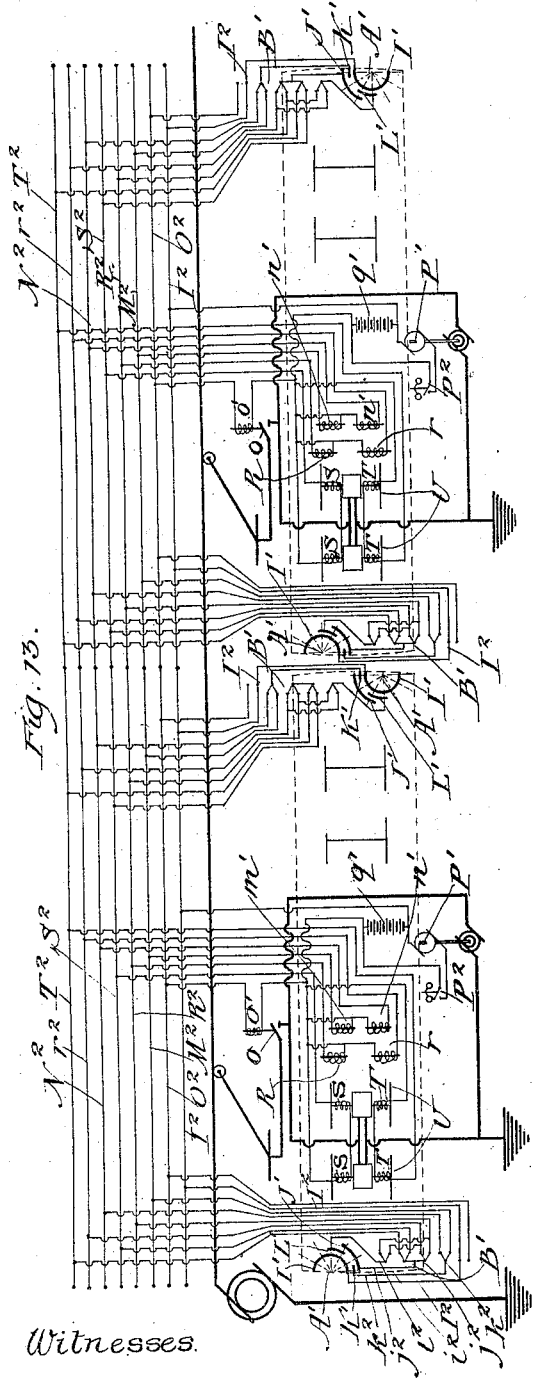
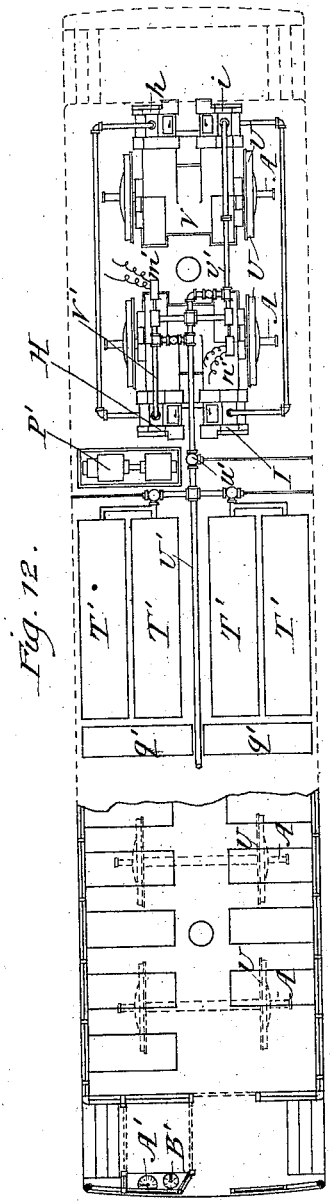
Witnesses.
W. Owen Thomas
Max W. Label
Inventor:
Bion J. Arnold.
By Charles A. Brown Cregier Brefield
Attorneys.

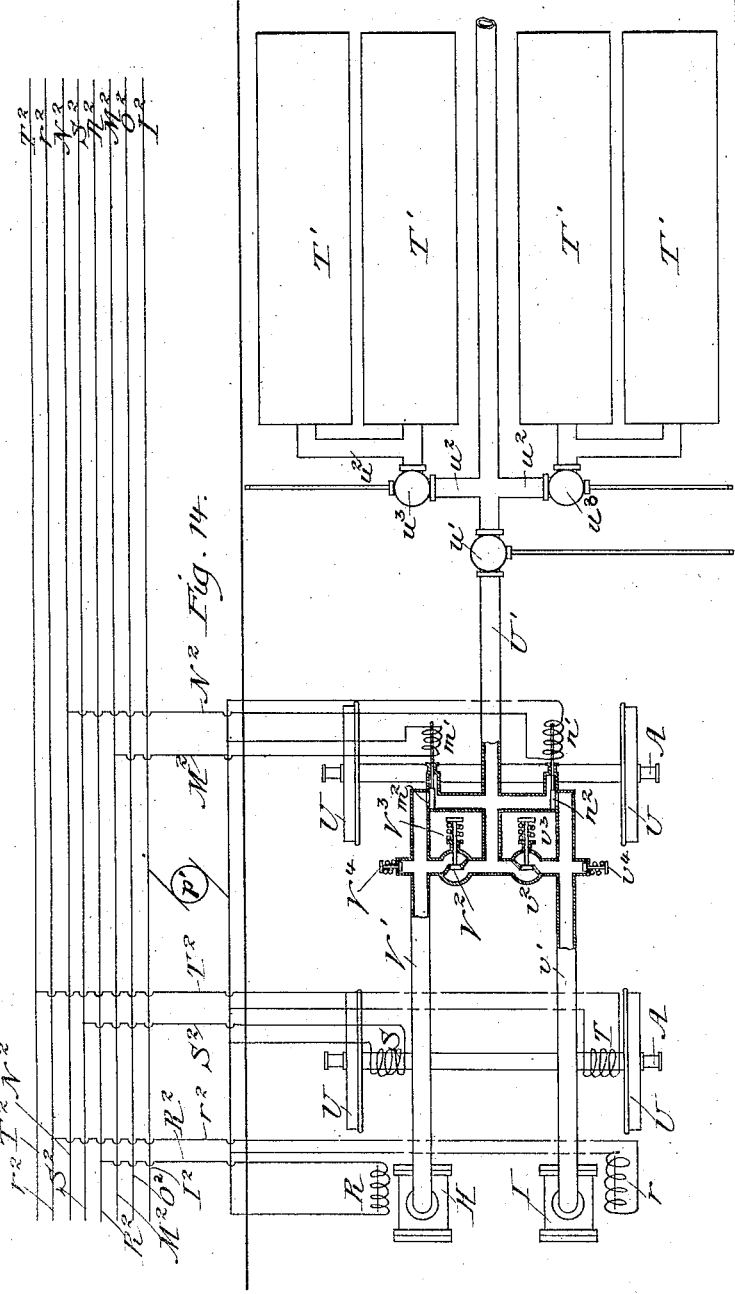

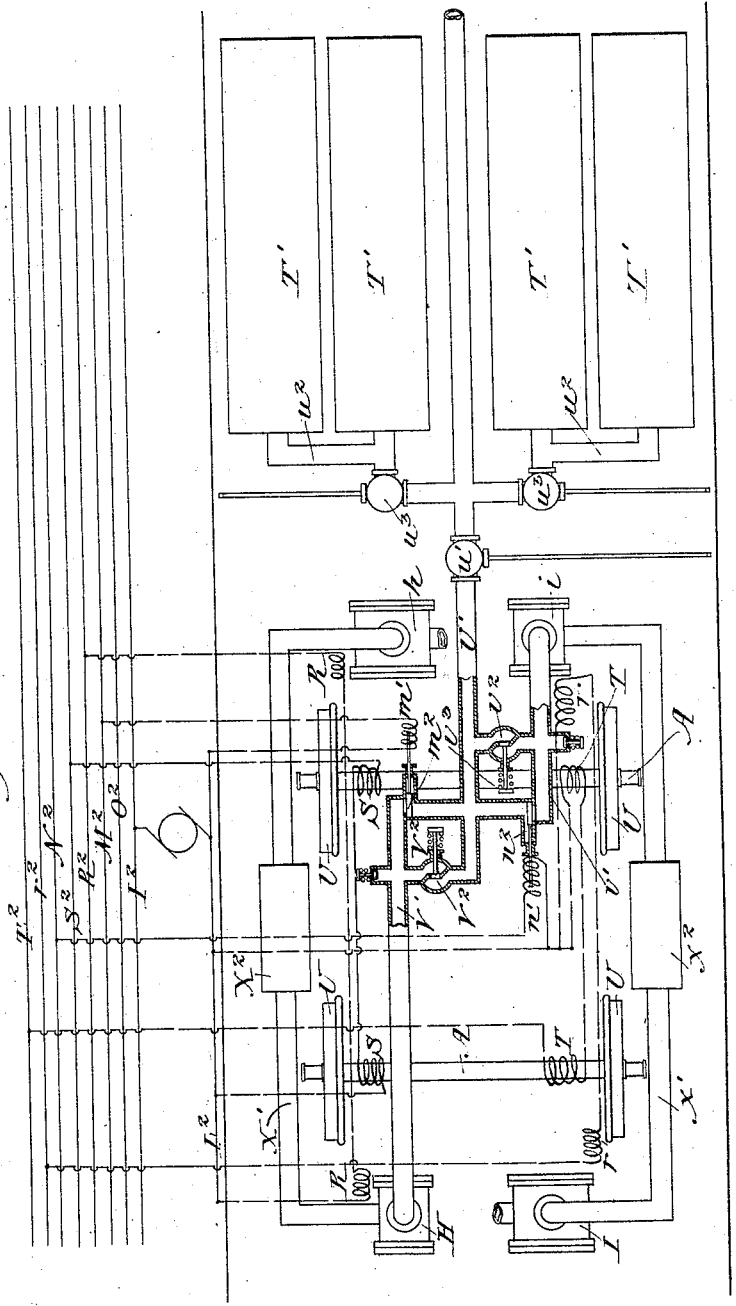

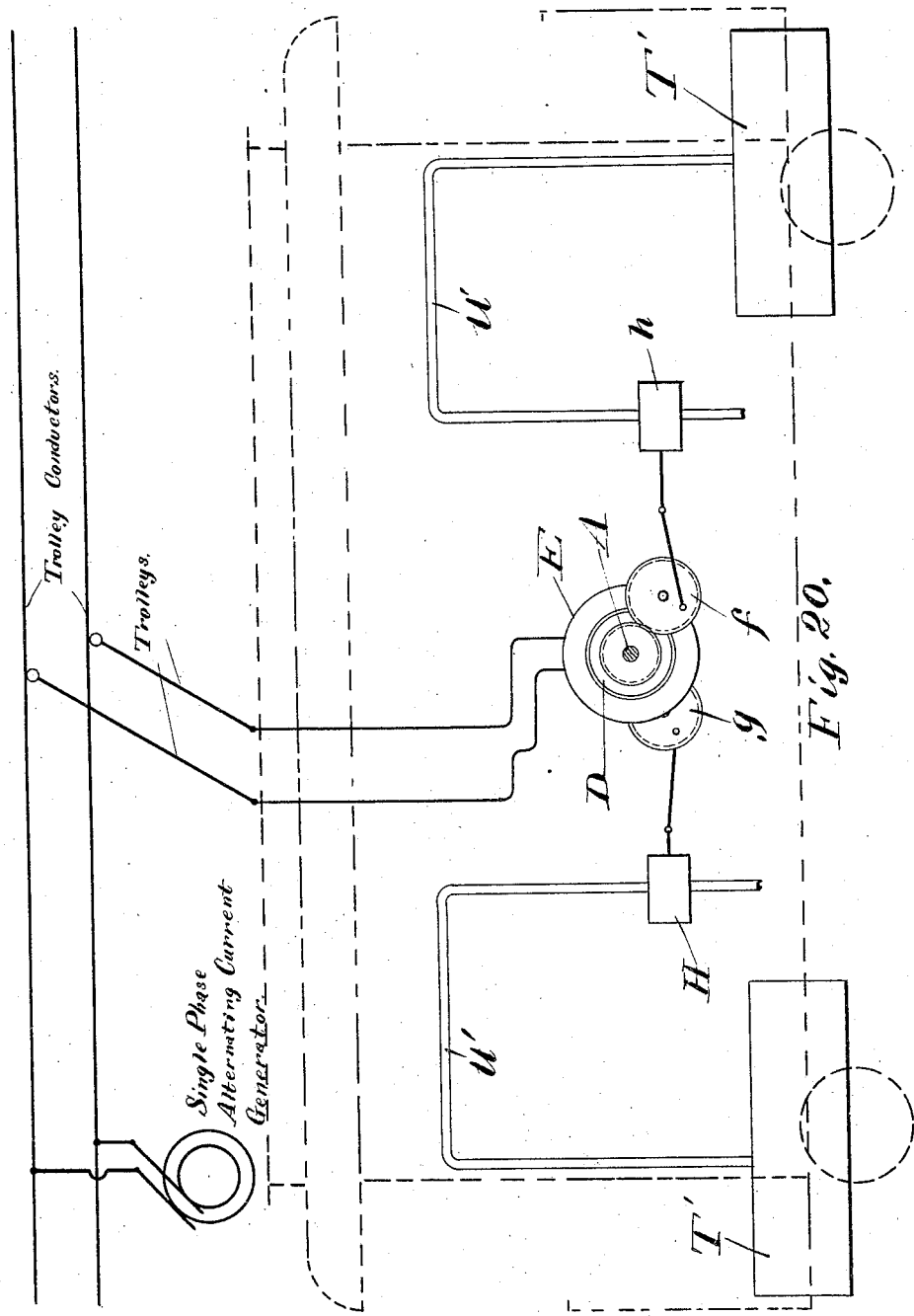

No. 759,223. Patented May 10, 1904.

UNITED STATES PATENT OFFICE.

BION J. ARNOLD, OF CHICAGO, ILLINOIS.

POWER-TRANSMISSION MECHANISM.

SPECIFICATION forming part of Letters Patent No. 759,223, dated May 10, 1904.

Application filed April 26, 1901. Serial No. 57,568. (No model.)

*To all whom it may concern:*

Be it known that I, BION J. ARNOLD, a citizen of the United States, residing at Chicago, in the county of Cook and State of Illinois, have invented a certain new and useful Improvement in Power-Transmission Mechanism, (Case No. 5,) of which the following is a full, clear, concise, and exact description, reference being had to the accompanying drawings, forming a part of this specification.

My invention relates to power-transmission mechanism, and more particularly to that class of power-transmission mechanism employed in the operation of vehicles, although my invention has other applications, and has for its object the improvement in construction of such mechanism whereby functions hereinafter more particularly set forth may be performed.

My invention has for its prime object the provision of power-transmission mechanism of this class in which a motor may be employed which is adapted to operate at practically a constant speed and constant load, but which is adapted to drive a variable load at a variable speed by means of its association and connection with means for storing surplus power developed by the motor when the driven load is slight, which means are thereafter adapted to restore the accumulated power to aid the motor in driving the load when heavy or to drive the load independently of the said motor. I may also employ the aforesaid means for starting the motor from a state of rest, which would be advantageous, for instance, when single-phase alternating-current motors are employed.

In the preferred embodiment of the invention when applied more particularly to electric traction systems I employ an electric motor which may be suitably operated through the agency of a trolley or the like and which is adapted when in electrical connection with the supply-circuit to run at a practically constant speed and constant load.

The power developed by the motor is utilized in operating the vehicle or car upon which it is placed and is also used for compressing fluid or otherwise storing the surplus energy of the motor. The motor is preferably not rigidly connected with the driving-shaft of the truck upon which it is mounted, but is associated therewith in such a manner through the interposition of means for storing surplus energy thereof that the speed transferred by the said motor to the said truck may be varied as desired. The field-frame of the motor and the armature are both revolubly mounted and are preferably both associated with fluid-compressing means which are adapted to be converted into engines, thus serving both as retarding and accelerating means for their respective motor elements. Either motor element is adapted for connection with the shaft of the truck through the agency of suitable means, such as gears or electric clutching mechanism. The motor is thus adapted to consume a constant supply of energy, which energy is utilized either directly or indirectly to propel the vehicle and in some instances to start the motor from a state of rest, the fluid-compressing means serving to absorb the entire power of the electric motor when the truck is standing still or when it is requiring no power to propel it, (which would be the case in descending a grade or when the truck was being propelled by the momentum of the vehicle and all of the power of the motor not needed for the propulsion of the truck,) the power stored by the said fluid-cylinders being adapted to operate the same as engines to assist in accelerating and propelling the truck when necessary, as in starting or ascending a grade.

My invention further contemplates the provision of improved means for controlling the operation of power-transmission mechanism constructed in accordance with my invention, the said controlling means being so constructed and arranged that when several vehicles are united to form a train the operation of the train may be controlled from either controller of any of the said cars or vehicles.

Further objects and advantages of my invention will be apparent from the construction, which I will now describe more in detail in connection with the accompanying drawings, illustrating one embodiment thereof, in which—

Figure 2:
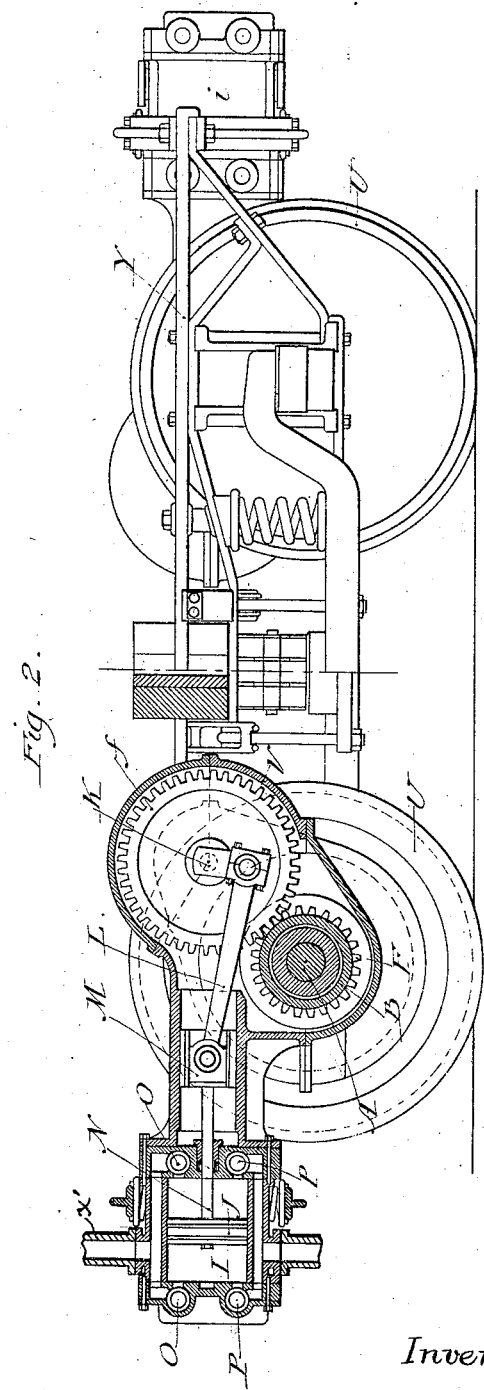
Figure 3:
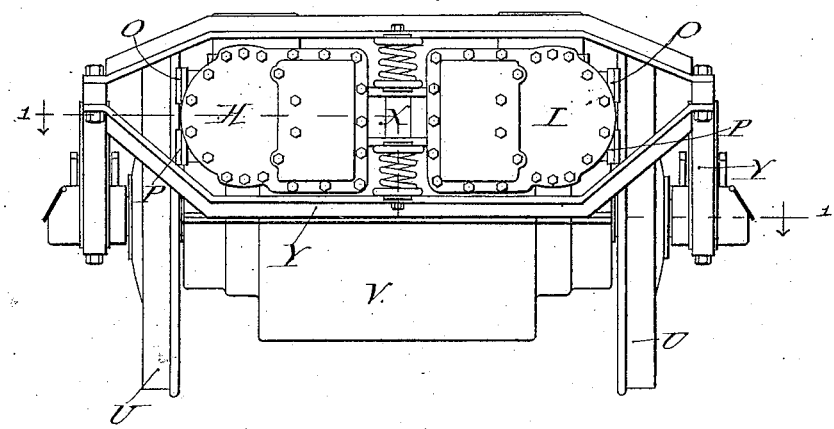
Figure 4:
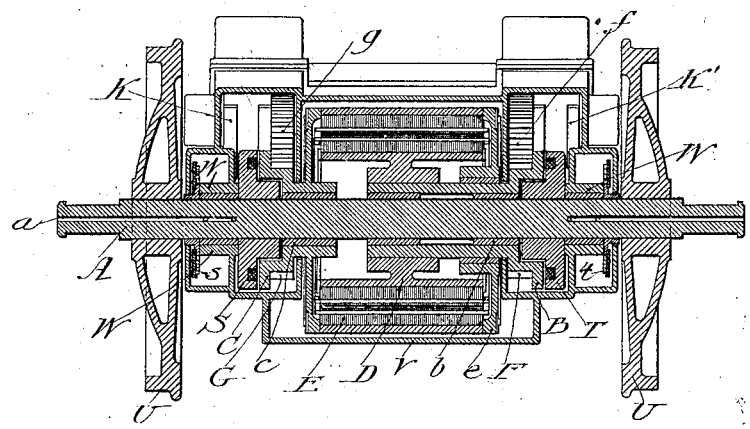
Figure 5:
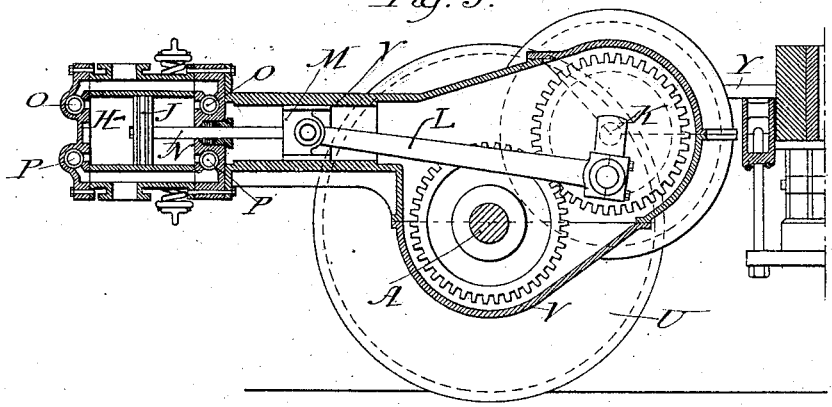
Figure 6:
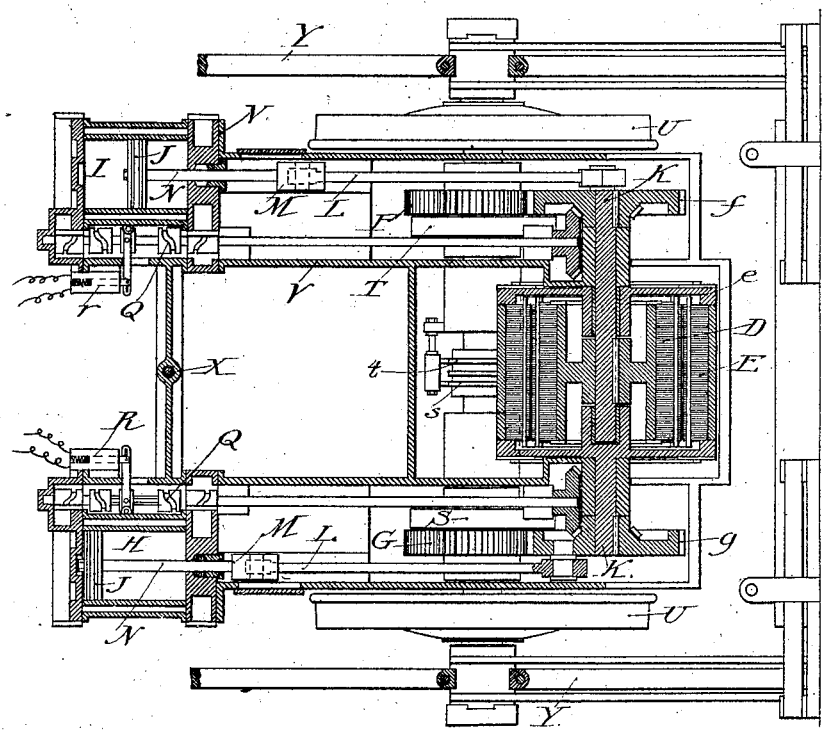

Figure 1 is a view, half in plan and half in horizontal section, of a power-transmission mechanism constructed in accordance with my invention, one complete apparatus being associated with each axle of a car-truck on line 1 1, Fig. 3. Fig. 2 is a side view, partially in elevation and partially in section, on line 2 2 of Fig. 1. Fig. 3 is an end elevation of the truck shown in Fig. 1. Fig. 4 is a sectional view on line 4 4 of Fig. 1. Fig. 5 is a vertical longitudinal sectional view of a modification of the apparatus illustrated in Fig. 1. Fig. 6 is a horizontal longitudinal sectional view of the same. Fig. 7 is a horizontal longitudinal sectional view of a further modification. Fig. 8 is a top view of my improved controlling mechanism. Fig. 9 is a partial sectional view thereof on line 9 9 of Fig. 8. Fig. 10 is a top view of the controller shown in Fig. 8, the cover being removed. Fig. 11 is a diagrammatic view showing the electrical connections between the controller and reversing-switch segments and their connection with the various parts of the electrical and controlling mechanisms. Fig. 12 is a top view showing the location of the electrical, pneumatic, and mechanical mechanisms and the general arrangement of the same upon a double-truck car, portions of the car being broken away to more clearly reveal features of construction. Fig. 13 is a diagrammatic view of the electrical connections when two or more cars are coupled to form a train. Fig. 14 is a diagrammatic view showing the connections between the fluid-storage reservoir and the fluid mechanism and the electric means by which their control is effected. Fig. 15 is a similar view showing my improved system as applied in connection with the two axles of a truck, the compound fluid-cylinders being coupled. Fig. 16 is an end elevation of the cable-coupling for the electrical connections at one extremity of a car. Fig. 17 is a side view thereof. Figs. 18 and 19 are plan views, respectively, of the couplings shown in Figs. 16 and 17. Fig. 20 is a comprehensive diagrammatic illustration of the apparatus of my invention.

Like characters of reference indicate like parts throughout the different figures.

I have shown my improved power-transmission mechanism as applied in the drawings more particularly to an electric system, the apparatus being mounted upon the truck of a vehicle comprising axles A A, upon which are suitably mounted the wheels U. In the system as shown I have provided means in connection with the axles A comprising a conduit $a$ for supplying current to the electrical apparatus used in propelling the vehicle. A quill-shaft B, which carries an armature D of an electric motor, is mounted upon the axle A, suitable non-frictional bearings or bushings $b$ being interposed between the quill-shaft B and the axle A. A second quill-shaft C is similarly mounted about the axle A and carries a field-frame E of the said electric motor, suitable non-frictional bearings or bushings $c$ being interposed between the said axle and the said quill-shaft.

The armature D of the electric motor and the field-frame E thereof need not be mounted fixedly upon the quill-shaft B, but may be geared or otherwise connected thereto, if desired, the members of the motor rotating with respect to each other and with respect to a point in space.

I provide suitable brushes and collector-rings $d$ to supply current to the field-windings of the field-frame E. I retain the field-frame E in its normal concentric position about the armature D by means of a flange $e$, which may be secured to the said field-frame to support the overhanging end thereof. Through the agency of the quill-shafts upon which the armature D and the field E of the motor are mounted the said motor parts may both revolve about the said axle A, if desired, and either may be coupled to the said axle through the agency of means to be hereinafter more fully set forth.

In order to effect a rotation of the axle A by means of one of the motor elements which may be coupled thereto, I associate suitable retarding means with each of said motor elements, whereby one may be caused to remain stationary or revolve slowly, so that the remaining motor element, which is caused to revolve at a constant speed relatively to the first motor element, may effect a rotation of the said driving-axle A. The means which I prefer to employ to effect this result comprise fluid-compressing cylinders H $h$ I $i$, which are provided with suitable valving mechanism and reversing-valve-actuating mechanism, so that they serve in the double capacity of either fluid-compressing cylinders or fluid-engine cylinders, as required.

The fluid-cylinders H $h$ are provided, respectively, with crank-shafts K, to which they are connected through the agency of pistons J, piston-rod N, cross-head M, and connecting-rod L, Figs. 1 and 2. I employ a gear F, which may be a part of quill-shaft B, said gear engaging a pinion $f$, attached to crank-shaft K of fluid-cylinder I by any suitable keys or clutches. I provide a corresponding gear G, which may be secured to or be part of quill-shaft C and which is adapted to engage a corresponding gear $g$, attached to the crank-shaft K of fluid-cylinder H through the agency of suitable keys or clutches.

Cylinders H $h$ are connected by their mechanism to the field-frames E E of the electric motors on the two axles A A, Figs. 1 and 2, and cylinders I $i$ are connected by their mechanism to armatures D D of the same motors, so that fluid-cylinder H and its mechanism may be called a "field" compressing and driving engine and fluid-cylinder I and its mechanism, the "armature" compressing and driving engine.

The fluid-cylinders H I $h$ $i$ are each provided with admission-valves O O and exhaust-valves P P, which valves are suitably actuated or controlled by a reversing mechanism Q. Any suitable form of reversible valve-actuating mechanism may be employed, as is well understood, a simple cam-valve gear Q, Fig. 1, being shown for the sake of clearness, it being so arranged that in its normal position the valves P and O will be actuated to enable cylinders H $h$ I $i$ to compress fluid when pistons J are reciprocated by the action of the electric motor.

It will thus be seen that as each motor element is associated with a fluid-cylinder the said motor element may be held stationary or caused to revolve at a slow speed on account of the retarding influence of the said fluid-cylinder when so connected as to compress fluid. In this case the remaining motor element which is caused to revolve relatively to the first aforesaid motor element at a constant speed may be connected to the driving-axle, and thus cause a rotation thereof.

The means which I prefer to employ to effect engagement between the various motor elements and the shaft A consists of a magnetic clutch of suitable form, which may be rigidly or flexibly secured to the said axle A or driving-wheel U and may be so arranged that it will engage any suitable fixed portion of the motor elements to join the same to the axle at will. I have shown a magnetic clutch S as adapted to unite the axle A to the quill-shaft C, a similar clutching mechanism T being employed to engage quill-shaft B or other suitable part connected to armature D to join the same to the axle A. In order to effect a reversal of the valve-actuating mechanism Q, I employ solenoids or other suitable devices R $r$ $r'$ $r^2$, associated, respectively, with the cylinders H I $h$ $i$. The solenoids are suitably united to the valve-actuating mechanism and are electrically connected to a reversing and controlling switch to be hereinafter more specifically set forth.

In order to supply current to the clutches S T, I employ suitable collector-rings $s$ $t$, the connecting-wires being preferably led through the conduit $a$ in the axle A when said clutches are mounted directly on the axle.

Any suitable form of casting—as, for instance, V—may be employed as the framework and casing of the entire mechanism and may be either supported by suitable bearings W W on the axle and the yoke X flexibly connected to the frame Y, Figs. 1 to 6, or rigidly bolted to frame Y.

Referring more particularly to Fig. 14, I have shown the way in which I associate the fluid-cylinders of my invention with storage-tanks and controlling mechanism. The ports of fluid-cylinder H are associated with a supply-pipe V', a similar supply-pipe $v'$ being associated with the fluid-cylinder I. The supply-pipes V' and $v'$ are connected to the main pipe U' respectively through the agency of throttles $m^2$ $n^2$ and also respectively through the spring-valves $V^2$ $v^2$. The springs $V^3$ $v^3$ of the said spring-valves $V^2$ $v^2$ are so adjusted as to allow fluid to pass from the supply-pipe V' to the main supply-pipe U' when the pressure in V' is great enough to overcome the pull of the spring $V^3$ and the pressure on the side of the valve toward U'. I provide ordinary relief-valves $V^4$ $v^4$, respectively associated with the pipes V' $v'$ to prevent the formation of a vacuum in said pipes V' and $v'$ by the action of cylinders H and I when running light with valving mechanism set for an engine.

The main supply-pipe U' is provided with shut-off valves $u'$ and is connected to reservoirs T' through the agency of suitable supply-pipe $u^2$, which may also be provided with shut-off valves $u^3$. Main supply-pipe U' may be extended in either direction and joined to more reservoirs or fluid-cylinders, if desired. The throttles $m^2$ and $n^2$ are respectively operated by throttle-solenoids $m'$ $n'$, suitably electrically connected with controlling mechanism, as hereinafter set forth.

In a modification of the invention as shown in Fig. 15, in which compound fluid-cylinders are employed, I utilize receiving-pipes X' $x'$ between the high and low pressure cylinders. I also interpose suitable cooling or heating jackets or devices, shown as intercoolers and reheaters $X^2$ $x^2$, through which the pipes X' $x'$ may pass.

A switch $o$, Fig. 13, is employed to establish connection through the electric-motor circuit, said switch being controlled by a solenoid $o'$, Figs. 11 and 13. In order to effect operation of the solenoids employed in the operation of my system, I employ a source of direct current $p'$, which source in this instance is the direct current end of a motor-generator if the car is to be run on an alternating-current system. In connection with the generator $p'$ I employ a secondary battery $q'$, which is preferably connected in parallel with the generator $p'$. I insert an automatic cut-out $p^2$, shown in this case as a fly-ball governor and switch, which is adapted to prevent the battery from driving the generator as a motor when the speed of the generator is decreased, so that its electromotive force becomes lower than that of the battery. The battery is also adapted to act as an equalizer for the generator and to take the load of the controlling-circuit when the circuit of the generator $p'$ has been broken by the cut-out $p^2$.

By referring more particularly to Figs. 8 to 11 I will now describe the controlling mechanism, comprising controller and reversing switches for controlling the operation of my improved system. I have shown dials Z Z', which are respectively the dials of the controller and reversing switches, dial Z containing the operating positions "$B_a$," "$O_a$," "$R_a$," "1," "2," "3" and dial Z' containing the operating positions "1," "2," "3," "4," "5," each position being provided with suitable contact-segments connected with the various controlling devices by the controlling-circuit wires.

The controller-handle A' is provided with a suitable locking device M' for holding the same directly over any operating position, said handle A' being adapted to be moved from operating position "B$_a$" to operating position "3" on dial Z of the controller when the reversing-switch handle B' is at any of its operating positions "2," "3," "4," or "5." The handle A' is so arranged that it can be removed only when over operating position "O$_a$," which position it must normally occupy when the mechanism of the car is not in operation or when it is being controlled by any other controller on the train. The reversing-switch handle B' can also be removed only when over operating position "O$_a$."

A suitable operating-valve C' may be used in connection with any ordinary air-brake mechanism to brake the train and may be actuated by means of the controller-stem D' of the controller. The controller-stem D' carries an arm $g'$, which is provided with contact points or brushes H', which are capable of making contact between current-carrying segments of the said controller. The controller-stem D' also serves, by means of the connecting-bar E', to actuate the locking-plunger F'.

The handle B' of the reversing-switch is fastened to a spindle N', which spindle carries a locking-disk O'. The locking-disk has suitable notches or slots P' P' P' P', which come opposite plunger F' when handle B' is over either operating positions "2," "3," "4," and "5" of dial Z', said slots being of sufficient depth to allow handle A' to make its full travel from operating position "B$_a$" to operating position "3." A second series of notches Q' Q' are also provided within the locking-disk O', which come opposite the plunger F' when handle B' is over operating positions "O$_a$" and "1," which slots are only of sufficient depth to allow handle A' to move between the operating positions of "B$_a$" and "O$_a$." When plunger F' enters any of these slots P' P' and Q' Q' by the movement of handle A', handle B' is locked over any of the operating positions of dial Z' over which it has been previously placed. When none of these notches or slots P' or Q' are opposite the plunger F', handle A' will be locked over operating position "B$_a$" of dial Z. I employ a spring R' or other suitable means to engage the slots P' Q' of the locking-disk O' when handle B' is over any of the operating positions on the controller-dial Z'.

The controller actuated by the handle A' is provided with three positive-current-carrying segments J' K' L' and a return-current-carrying segment I', all of which segments are suitably mounted upon insulating-strips S'. Contact points or brushes $h'$ $h'$ are provided for the reversing-switch actuated by handle B', which brushes are adapted to make contact between the respective current-carrying segments of the said reversing-switch. The segments J', K', and L' have corresponding segments $j'$ $k'$ $l'$, provided within the reversing-switch, which segments are electrically united by wires $j^2$ $k^2$ $l^2$. The return-circuit segment I' of the controller is united, by means of a return-circuit wire I$^3$, to four return-circuit segments $i'$ of the reversing-switch. The return-circuit segment I' is permanently electrically connected to one side of the source of current-supply by means of the wire I$^3$, the remaining terminal of the said source of supply being electrically connected, by means of a conducting-wire I$^2$, to one terminal of each of the controlling-solenoids employed in the operation of my system. These reversing-switch segments and others are all suitably mounted upon insulating-strips S'.

The solenoid R, which controls the operation of the valve mechanism Q of the fluid-cylinder H, is electrically connected to the common return-wire I$^2$ and to the reversing-switch segments R$^3$ and R$^4$ by means of the wire R$^2$. The solenoid $r$, which controls the valve mechanism of the cylinder I, is connected at one terminal to the return-circuit wire I$^2$, the remaining terminal being connected, by means of the conducting-wire $r^2$, to the reversing-switch segments $r^3$ $r^4$. The solenoid R may of course be so constructed as to control the cylinders H and $h$ and the solenoid $r$ to effect the control of cylinders I and $i$.

The current-carrying coil of the magnetic clutch S is electrically united with the return-circuit wire I$^2$ and the reversing-switch segments S$^3$ S$^4$ through the agency of the circuit-wire S$^2$. The armature-clutch T is connected likewise between the return-wire I$^2$ and the reversing-switch segment T$^3$ by means of the circuit-wire T$^2$.

The solenoid $m'$ is connected between the common return-circuit I$^2$ and the reversing-switch segments M$^3$ and M$^4$ by the connecting-wire M$^2$, said solenoid being adapted to operate the throttle $m^2$ of the cylinder H. The corresponding solenoid $n'$, which is arranged to operate the throttle $n^2$ of the cylinder I, is connected between the common return-circuit I$^2$ and the reversing-switch segments N$^3$ and N$^4$ by means of the wire N$^2$. It will thus be seen that the reversing-switch segments are mounted in such a way that the control of the apparatus after the electric motor has been started is done by means of the controller actuated by handle A', as the reversing-switch can only directly supply current independently of the controller to the solenoid O' and in its first operating position to the solenoids controlling the operation of the fluid-engines to operate the same to enable them to start the electric motor from a state of rest. After the handle B' has passed beyond its first operating position current can only be supplied to the various solenoids, excepting solenoid $o'$, through the agency of the controller controlled by the handle A'.

I will now explain the various operations and actuations of the solenoids which effect the control of the fluid cylinders and motors by referring more particularly to Fig. 11, where I have diagrammatically indicated the connections of one complete set of solenoids with a reversing-switch and controller. The handles A' and B', with their corresponding contacts H' $h'$, are respectively shown in the operating positions "B$_a$," "O$_a$." If handle B' is now moved to operating position "1" on the dial Z', the bridging contact-points $h'$ will engage the return-current segments $i'$ and the circuit-segments $r^3$ N$^3$ R$^3$ M$^3$, whereby the reversing-solenoid $r$, solenoid $n'$, and actuating-throttle $n^2$ of the cylinder I (attached to armature D) are operated and at the same time operating the reversing-solenoid R and throttle-solenoid $m'$ of cylinder H, (attached to field-ring E.) The cylinders H and I thereby become fluid-engines, receiving compressed fluid (previously stored) from the reservoirs T' through pipe U', and respectively serve to rotate the field E and armature D at the same speed in opposite directions. When the proper relative speed between field E and the armature D has been attained, the handle B' may be moved over to either operating position "2" or "3" of the dial Z' of the reversing-switch. The bridging contact $h'$ will now engage return-circuit segment $i'$ and circuit-segment $o^3$, whereby the circuit $o^2$ is completed and current supplied from the direct-current source $p'$ or battery $q'$ to the solenoid $o'$, which is thereby operated and serves to close the switch $o$ of the electric-motor circuit. Thus current is supplied to the motor, which now operates electrically and will continue to do so as long as operating-handle B' remains upon the operating position "2" or "3." The field E and the armature D are now revolving electrically at equal speeds in opposite directions and causing pistons J to reciprocate in the cylinders H and I by means of the gears G $g$ and F $f$, crank-shafts K K$^2$, connecting-rods L, cross-heads M, and piston-rods N. If now the motor continues in operation and the solenoids R and $r$ are not energized, the valve-actuating mechanism of both cylinders will be in their normal condition, so that fluid will be compressed into the pipes V' $v'$. When the pressure within the pipes V' $v'$ is sufficient, spring-valves V$^2$ $v^2$ will open and allow the compressed fluid to flow through the main supply-pipe U' into the storage-reservoirs T', from where it may thereafter be withdrawn as needed for driving the fluid-engines. When handle B' is over either operating position "2" or "5,"

suitable contact is effected, through the agency of the bridging-contact points $h'$, between the segments $j'$, $k'$, and $l'$, which are joined, respectively, by wires $j^2$ $k^2$ $l^2$ to controller-segments J' K' L' and certain circuit-segments of the reversing-switch, so that the proper solenoids for regulating the motion of the car in a forward direction are brought under the control of the handle A' of the controller-switch. The segment J' of the controller will thus be joined through the wire $j^2$, reversing-switch segment $j'$, bridging piece $h'$, through circuit-segments R$^3$ and S$^3$ or R$^4$ and S$^4$, circuit-wires R$^2$ and S$^2$, through the reversing-solenoid R and clutch S, thus bringing solenoid R and clutch S under the immediate control of handle A'. In like manner reversing-solenoid $r$ and throttle $m'$ are brought under the same control by being joined, respectively, to segment L' through the wire $l^2$, segment $l'$, bridging pieces $h'$, circuit-segment $r^3$ or $r^4$, and circuit-wire $r^2$. Segment K' of the controller is connected by means of wire $k^2$, segment $k'$, bridging piece $h'$, through circuit-segment M$^3$ or M$^4$, and circuit-wire M$^2$. It will thus be seen that the same electrical conditions exist when the reversing-switch handle B' is in the operating positions "2" and "5," with the exception that in operating position "2" contact is effected between the return-current segment $i'$ and the circuit-segment $o^3$, which contact is not made in operating position "5," as in this position the electric motor is not adapted to operate, and the car can only be propelled by the power of the fluid-engines when the requisite circuit connections are completed by the movement of handle A'.

In order to prepare the car for operation in a backward direction, the reversing-switch handle B' would be placed over operating position "3" if propulsion by means of electric motors and fluid-engines both were desired or over operating position "4" if propulsion by the fluid-engines only were desired instead of over operating positions "2" or "5," which correspond to the forward direction of travel. When in these operating positions—that is, "3" and "4"—the reversing-solenoid $r$ and throttle-solenoid $n'$ of cylinder I and reversing-solenoid R of cylinder H and the clutch T are brought under the direct control of handle A' of the controller. The reversing-solenoid $r$ and the clutch T are brought under the control of handle A' through the circuit $r^2$ T$^2$, circuit-segment $r^4$ T$^3$, bridging piece $h'$, reversing-switch segment $j'$, and wire $j^2$ to the controller-segment J'. The throttle-solenoid $n'$ is also brought under the control of handle A' through the circuit-wire N$^2$, circuit-segment N$^4$, bridging contact-piece $h'$, reversing-switch segment $k'$, and wire $k^2$ to the controller-segment K', and reversing-solenoid R of cylinder H is brought under the same control through the circuit-wire R$^2$, circuit-segment R$^4$, bridging contact-piece $h'$, reversing-switch segment $l'$ and wire $l^2$ to the controlling-segment $L'$.

By the word "forward" direction of travel as I have used it above I mean the direction the motorman would be facing when standing at one of the controllers, and the car machinery is so arranged that when the car is traveling in this direction the wheels U would revolve in the same direction as the field E of the electric motor, and when the car is traveling in the opposite or "backward" direction the wheels U will revolve in the same direction as the armature D. It will therefore be apparent that if the controlling mechanism at the opposite ends of a car is to be so arranged that the direction of travel will always be in the direction the motorman is facing it will be necessary that the operating positions "2" and "5" of the one controller must be attached to the same circuits as the operating positions "3" and "4" of the controller at the other end of the car, and vice versa. If now handle B' is over the forward operating position "2" and handle A' be moved to operating position "R$_a$" of the dial Z, the contact bridging pieces H' will effect electrical connection between the segments I' and L', and thus supply current to the solenoid $r$ of the cylinder I, whereby the valving mechanism of the said said cylinder I, which is attached to armature D, is reversed, so that it will not compress fluid and will be relieved of vacuum by the relief-valve $v^4$. Armature D with its load removed will now increase in speed until field E, which is adapted to maintain relatively a constant speed to said armature D by means of the current supplied from the transmission-circuit, is brought to a standstill. By moving handle A' to operating position "1" clutch S will fixedly unite field-frame E to axle A, and at the same time solenoid R will reverse the valving mechanism of the cylinder H, so that it will be ready to operate as an engine. Contact is effected, as will be readily apparent from Fig. 11, as the bridging piece H' electrically unites segments J' I'. When the handle A' is moved to operating position "2," the contact between segments L' and I' is broken, whereby reversing-solenoid $r$ is released, so that cylinder I again becomes a compressor, which serves to retard the rotation of armature D, and as field E and armature D will maintain the same relative speed to one another field-ring E, attached to axle A, will slowly start revolving, and thus propel the car, which will continue to accelerate until the maximum speed is reached. If the acceleration of the train becomes too rapid with handle A' remaining upon operating position "2," handle A' may again be placed over the operating position "1," whereby the speed will be decreased. When this is done, the valving mechanism of the compressing-cylinder is reversed and the air accumulated during the period that the handle A' was over the operating position "2" will be exhausted freely into the atmosphere and will continue to so exhaust, and thus reduce the pressure behind the piston J of the compressing-cylinder I, until it is completely exhausted, or, if it is desired to further accelerate the car, the handle A' would again be placed over operating position "2." When handle A' is moved to operating position "3," cylinder H, attached to the field-frame E, (whose valving mechanism has already been set in such position as to enable said cylinder to operate as an engine,) will be supplied with fluid from the reservoir T' after the actuation of the throttle-solenoid $m'$, which is attached through the various wires and segments to the segment K' of the controller, and the car would be propelled and accelerated more rapidly by the combined power of the fluid-engine and the electric motor. If the valving mechanism of the cylinder, which has been used as a compressor to retard one element of the electric motor, is suitably designed to enable its cylinder and its ports to be used as an engine, so that it may cause the part of the motor to which it is attached to rotate in the opposite direction to which it was running before it was stopped, the speed of the other part of the motor will be correspondingly increased and the acceleration of the car still continued to any practical speed, since the proper relative speeds between the valving portions of the motor are still maintained. If during these movements of handle A' handle B' had been over backward-operating positions "3" and "4" of the reversing-switch or the forward-operating positions "2" and "5" of the reversing-switch at the other end of the car, solenoid $r$ and clutch T would have been connected to segment J' in place of the solenoid R and the clutch S, solenoid $n'$ would have been connected to segment K' in place of solenoid $m'$, and solenoid R would have been connected to segment L' in place of solenoid $r$, in which case the car would have been propelled in the opposite direction, as the wheels U would have been revolved in the direction of the armature D instead of in the direction of rotation of the field-ring E, as the clutch mechanism T is adapted to operatively associate said armature with the axle, whereas clutch S had previously associated field-frame E with the said axle A. The operation of handle A' is obviously the same as for the forward motion. When the truck has been accelerated, as previously described, sufficiently to make it no longer necessary to require power to keep it in operation other than the momentum of the train of which the said car or truck is a part, the handle A' may be returned to operating position "O$_a$" of the dial Z, in which case all the mechanism of the actuating mechanism associated with the axle A is included and all the circuits of the controller mechanism broken, so that the cylinders are adapted to compress fluid into the tanks T' and absorb all the power given out by the motor, as was previously the case when the handle A' was over the operating position "O_a." It will be seen that the car is thus propelled by its own momentum, or coasting, with brake-valve on lap, and may be gradually brought to a standstill through the agency of any suitable braking mechanism.

If it is desired to stop the car, handle A', which is connected with the braking mechanism, may be moved to operating position "B_a," in which event air is admitted to the brake-cylinders and the speed of the car is slackened as desired. By moving the handle A' toward operating position "R_a" air is exhausted from the said brake-cylinders in the usual manner employed in the operation of air-brakes, said handle being alternated between the operating positions "B_a" and "R_a," its position over the operating position "B_a" signifying full application of the brakes and its position over the operating position "R_a" signifying full release thereof. The cylinders are now acting as compressors and serve to store fluid through the agency of the power developed by the electric motor and will continue to do so until the motor is stopped, which may be done by breaking the circuit through switch $o$ or until it becomes necessary to repeat the above cycle of operations for again starting or accelerating the car or train. Any suitable form of air-brake may be employed, a standard form being here illustrated for purposes of clearness, said air-braking mechanism being directly under the control of handle A', which, although not absolutely essential, is desirable, inasmuch as it is thereby impossible to operate the reversing mechanism of the car before said car is brought to a standstill or at least before all circuits are broken by means of the controller. This might be done if the air-brake were operated by means of a separate operating-handle, as in the ordinary case.

As has been stated, the truck may be propelled in either direction without the aid of the electric motor solely through the agency of the fluid-engines, provided, of course, that there be sufficient stored fluid in the storage-tanks. This constitutes a valuable feature of my invention, as the car is thus permitted to travel quite a distance without electrical energy in case of a breakdown of the electric-current-supplying apparatus and as it will permit the motor-car to leave the main track over which the trolley-wire extends and run over ordinary side tracks or spurs where there is no trolley-wire to pull cars not fitted with my improved system out upon the main line, this particular feature of my invention being more especially applicable in the operation of switching in railway-yards.

When two cars, both equipped with the system, are coupled together, as shown in Fig. 13, the circuits $M^2$, $R^2$, $S^2$, $N^2$, $r^2$, $T^2$, $o^2$, and $I^3$ are connected to a suitable socket-coupler, as shown in detail in Figs. 16 to 19, in which W' and $w'$ constitute, respectively, the projecting and socket parts of a cable-coupling between two cars having contacts lettered the same as the circuits to which they are respectively connected. When looking at the front of the coupler, as in Fig. 16, with the projecting parts of the coupler W' on the left and the socket $w'$ on the right, circuit $O^2$ is always on the top center contact and common return-circuit $I^3$ is on the bottom, as shown. Circuits $M^2$, $R^2$, and $S^2$ are arranged on the projecting portion W' and circuits $N^2$, $r^2$, and $T^2$ on the socket portion $w'$ of the coupler, as shown in Figs. 16, 17, and 19, at one end of the car and circuits $M^2$, $R^2$, and $S^2$ on the socket portion $w'$ and the circuits $N^2$, $r^2$, and $T^2$ on the projecting portion W', Fig. 18, at the other end of the car. Thus if the cars are so connected that in traveling in one direction the wheels U all revolve in the same direction as the fields E of the motors the front coupling of one car would be joined to the rear coupling of the other car and like-lettered circuits of both cars would be joined together, as would be the case if sockets shown in Figs. 18 and 19 were brought into engagement, and like parts of the mechanism of both cars would work simultaneously, whereas if one car were turned end for end on the track, so that its opposite end coupling be joined to the before-used coupling of the other car, two like couplings would be joined together and circuits $M^2$ $R^2$ $S^2$ of the one car would be joined to circuits $N^2$ $r^2$ $T^2$ of the other car, thus reversing the controlling connections of the car which was turned around and maintaining the same direction of travel as before from any one controller of the first car.

If the cylinders and the fluid-pressures are so proportioned and arranged, as shown in Fig. 15, that the cylinders H and I will exhaust above atmospheric pressure and two sets of the fluid-engines and motors are fitted to one truck, the cylinders H and I of one set may exhaust in the receiving pipes or chambers X' and $x'$, which in turn will supply the cylinders $h$ and $i$ of the other set. In this way the cylinders H and $h$, attached to the fields of both motors, and the cylinders I and $i$, attached to the armatures, are arranged to work in compound and are controlled exactly the same as in the former case, each cylinder valving mechanism being controlled simultaneously by solenoids, as before, like solenoids and clutches of each mechanism being connected in series and the pipes V' and $v'$, leading the fluid to the high-pressure cylinders, having throttle-valves $n^2$ $m^2$, being operated by solenoids $n'$ $m'$, as before.

If it is desired to stop the accelerating-engine when the car is up to maximum speed and needs only the power of the electric motor to propel it, gears $f$ and $g$ would be clutched to crank-shaft K instead of being keyed to it.

By similarly clutching gears F and G to the motor instead of rigidly connecting them the compressor could be clutched to the axle when descending a grade, so that the momentum of the train could be utilized for compressing fluid.

I will now set forth in detail the various operations and changes in the controlling mechanism of the car which occur as the handle is placed over the various operating positions of the controller and reversing-switch.

In Fig. 11 the contact parts are associated with dotted lines, which dotted lines are provided to aid in tracing the operations.

| Step. | Handle A' over position. | Handle B' over position. | |
|---|---|---|---|
| 1 | $O_a$ | $O_a$ | Car at standstill or being operated from the other controller on the train. Handles in position to be removed by operator. Controller connections all open and car safe to be left by operator, provided handles are removed. Brake-valve on lap. |
| 2 | $B_a$ | $O_a$ | Air-brakes full on. Handle B' unlocked. |
| 3 | $B_a$ | 1 | Both sides of electric motor revolved by fluid-engines. |
| 4 | $B_a$ | 2 | Main switch for electric motor closed. Motor driven electrically, each half driving its compressor at half-speed. Reversing-switch in position for car to be moved forward. Brakes full on. |
| 4 (a) | $R_a$ | 2 | Brakes released. Cylinder H compressing until field E is stopped. |
| 4 (b) | 1 | 2 | Field E clutched to axle A. |
| 4 (c) | 2 | 2 | Cylinder I compressing. Field E still clutched to axle A. |
| 4 (d) | 3 | 2 | Cylinder I still compressing. Field E still clutched to axle A. Cylinder H acting as a driving-engine. |
| 4 (e) | $O_a$ | 2 | Both cylinders compressing. Car coasting and brake-valve on lap. |
| 5 | $B_a$ | 3 | Main switch for electric motor closed. Motor driven electrically, each half driving its compressor at half-speed. Reversing-switch in position for car to move backward. Brakes full on. |
| 5 (a) | $R_a$ | 3 | Brakes released. Cylinder I compressing until armature D is stopped. |
| 5 (b) | 1 | 3 | Armature D clutched to axle A. |
| 5 (c) | 2 | 3 | Cylinder H compressing. Armature D still clutched to axle A. |
| 5 (d) | 3 | 3 | Cylinder H still compressing. Armature D still clutched to axle A. Cylinder I acting as a driving-engine. |
| 5 (e) | $O_a$ | 3 | Both cylinders compressing. Car coasting and brake-valve on lap. |
| 6 | $B_a$ | 4 | Main circuit for electric motor broken and electric motor stopped. Reversing-switch in position for car to move backward by fluid-engines. |
| 6 (a) | $R_a$ | 4 | Brakes released. |
| 6 (b) | 3 | 4 | Car propelled by cylinder I, which is clutched to axle A. |
| 6 (c) | $O_a$ | 4 | Car coasting and brake on lap. |
| 7 | $B_a$ | 5 | Main circuit for electric motor broken. Electric motor stopped. Reversing-switch in position for car to move forward by fluid-engines. |
| 7 (a) | $R_a$ | 5 | Brakes released. |
| 7 (b) | 3 | 5 | Car propelled by cylinder H, which is clutched to axle A. |
| 7 (c) | $O_a$ | 5 | Car coasting and brakes on lap. |

The operation of my improved system will now be apparent. If the car is standing still and it is desired to start the electric motor, power is supplied to the fluid-engines to drive the armature and field of the said motor in opposite directions until the speed of the motor has approached synchronism, after which the said motor is electrically connected with the transmission-line. The motor being now running, the mechanism of one of the fluid-cylinders may be reversed, so that it operates as a compressor and serves to retard the speed of revolution of one of the motor elements. The other element meanwhile increasing its speed relative to the axle of the car has a constant speed and is maintained between said motor elements due to the current passing therethrough. When the motor element which is connected with the compressor is stationary and the remaining motor element rotating at twice the normal speed, the first aforesaid motor element may be coupled to the axle and the valve mechanism of its associated compressor changed, so that the said compressor becomes a fluid-engine. If the car is now to be started, the fluid-cylinder associated with the rotating motor element is so arranged that it acts as a compressor to tend to retard the motion of the said motor element, whereby the first-aforesaid motor element which is coupled with the axle of the truck serves to propel the car. If it is desired to accelerate the speed above that which could be obtained by the action of the motor alone, the fluid-engine associated with the motor part which is coupled to the axle may be supplied with compressed fluid to cause an operation thereof to assist the action of the motor. By moving the operating-handles between the various operating positions any desired acceleration or operating speed of the car may be obtained in either forward or backward direction.

I have herein shown and particularly described one embodiment of my invention; but it will be apparent to those skilled in the art that many modifications thereof may be made without departing from the spirit of my said invention, and I therefore do not wish to limit myself to the precise construction and arrangement as herein shown and particularly described; but,

Having thus described my invention, what I claim as new, and desire to secure by Letters Patent, is—

1. The combination with a vehicle, of a motor comprising two rotatable members, each having separable engagement with the vehicle running-gear, retarding means associated with one of said members, and means whereby the remaining motor member is adapted to propel the said vehicle, substantially as described.

2. The combination with a vehicle, of a motor comprising two rotatable members adapted to operate said vehicle, each having separable engagement with the vehicle running-gear, retarding means adapted for association with either motor element, and means whereby the remaining motor element is adapted to propel the said vehicle, substantially as described.

3. The combination with a vehicle, of a motor comprising two rotatable elements mounted upon said vehicle, and adapted to operate the same, said motor elements being adapted to revolve at a practically constant relative angular velocity, retarding means adapted for association with either motor element, and means for securing either motor element to the vehicle-axle to operate the same, whereby either motor element is adapted to propel the vehicle when the retarding means is associated with the remaining motor element, substantially as described.

4. In a traction system, the combination with a vehicle, of a vehicle-motor for effecting the propulsion thereof, said motor comprising two rotatably-mounted motor members, an accelerating and retarding engine associated with each motor member and adapted to control the travel of the vehicle, said retarding-engine serving to retard the rotation of one motor element, whereby the remaining motor element may be adapted to propel the vehicle, means for storing the energy accumulated in the operation of the vehicle, and means for admitting power to said engine to enable it to start the said motor, substantially as described.

5. In a traction system, the combination with a vehicle, of a vehicle-motor for effecting the propulsion thereof, said motor comprising two rotatably-mounted motor members, an accelerating and retarding engine associated with each motor member and adapted to control the travel of the vehicle, said retarding-engine serving to retard the rotation of one motor element, whereby the remaining motor element may be adapted to propel the vehicle, means for storing the energy accumulated in the operation of the vehicle, means for admitting power to said engine to enable it to start the said motor, and means for cooperatively associating said engine with the vehicle-motor to accelerate the speed of the vehicle, substantially as described.

6. In a traction system, the combination with a vehicle, of a vehicle-motor for effecting the propulsion thereof, said motor comprising two rotatable members, an accelerating and retarding engine for each member of the vehicle-motor to control the travel of the vehicle, means whereby either of said engines is adapted to retard the rotation of either motor element, whereby the remaining motor element is enabled to propel the vehicle, means for storing energy accumulated in the operation of the vehicle, and means for admitting power to said engines to enable the same to start the motor, substantially as described.

7. In a traction system, the combination with a vehicle, of a vehicle-motor for effecting the propulsion thereof, said motor comprising two rotatable members, each having separable engagement with the vehicle running-gear and an accelerating and retarding engine cooperating with the vehicle-motor to control the travel of the vehicle, substantially as described.

8. In a traction system, the combination with a vehicle, of a vehicle-motor for effecting the propulsion thereof, said motor comprising two rotatably-mounted motor members, retarding means associated with each of said motor members to control the operation of the vehicle, and means for storing energy accumulated during the operation of the said motor, substantially as described.

9. In a traction system, the combination with a vehicle, of an electric motor comprising two rotatably-mounted members and adapted normally to be continuously operated, and an accelerating and retarding engine associated with each motor member, whereby the speed of rotation of the said motor members may be controlled so that the said motor is adapted to start the vehicle and continuously operate the same, substantially as described.

10. In a traction system, the combination with a vehicle, of an electric motor comprising two rotatably-mounted members, said motor members being adapted to revolve relatively at a constant speed, said motor being adapted normally to be continuously operated, and an accelerating and retarding engine associated with each motor member, whereby the speed of rotation of the said motor members may be controlled so that the said motor is adapted to start the vehicle and continuously operate the same, substantially as described.

11. In a traction system, the combination with a vehicle, of an electric motor comprising two rotatably-mounted members, said motor members being adapted to revolve relatively at a constant speed, said motor being adapted normally to be continuously operated, an accelerating and retarding engine associated with each motor member, whereby the speed of rotation of the said motor members may be controlled so that the said motor is adapted to start the vehicle and continuously operate the same, and means whereby said engines may alone serve to operate the vehicle, substantially as described.

12. In a traction system, the combination with a vehicle, of a driving-axle therefor, a motor comprising two rotatable members adapted for propelling said vehicle, an accelerating and retarding engine associated with each motor element and adapted to control the speed thereof relative to the said vehicle, said motor members being adapted to rotate relatively at a practically constant speed, and means whereby either of said motor elements may be coöperatively associated with said driving-axle to drive the vehicle, substantially as described.

13. In a traction system, the combination with a transmission-line for supplying power to said system, of a vehicle, an electric motor mounted upon said vehicle for causing a propulsion thereof, said motor being adapted normally to operate at a practically constant speed, and equalizing means associated with said motor, whereby said motor when operating is adapted to absorb a practically constant amount of power from said transmission-line, substantially as described.

14. In a traction system, the combination with a transmission-line for supplying power to said system, of a vehicle, a motor mounted upon said vehicle for causing a propulsion thereof, and equalizing means associated with said motor, whereby said motor is adapted when operating to absorb a practically constant amount of power from said transmission-line, substantially as described.

15. In a traction system, the combination with a transmission-line for supplying power to said system, of a vehicle, a motor mounted upon said vehicle for causing the propulsion thereof, equalizing means associated with said motor whereby said motor is adapted when operating to absorb a practically constant amount of power from said transmission-line, and means for storing energy accumulated in the operation of the said vehicle, substantially as described.

16. In a traction system, the combination with a transmission-line, of a vehicle, a motor mounted upon said vehicle for causing a propulsion thereof, an accelerating and retarding engine associated with said motor, whereby said motor is adapted to absorb a practically constant amount of power from said transmission-line, and means for storing energy accumulated in the operation of said vehicle, substantially as described.

17. In a traction system, the combination with a transmission-line, of a vehicle adapted for operation in said system, a motor mounted upon said vehicle for causing a propulsion thereof, said motor comprising two rotatably-mounted motor elements, an accelerating and retarding engine associated with each motor element, whereby said motor is adapted to absorb a practically constant amount of power from said transmission-line, and means for storing energy accumulated in the operation of said vehicle, substantially as described.

18. In a traction system, the combination with a transmission-line, of a vehicle adapted for operation in said system, a motor mounted upon said vehicle for causing a propulsion thereof, said motor comprising two rotatably-mounted motor elements, an accelerating and retarding engine associated with each motor element, whereby said motor is adapted to absorb a practically constant amount of power from said transmission-line, and means for storing energy accumulated in the operation of said vehicle, said engines being adapted to utilize said accumulated energy to start the motor, substantially as described.

19. In a traction system, the combination with a transmission-line, of a vehicle adapted for operation in said system, a motor mounted upon said vehicle for causing a propulsion thereof, said motor comprising two rotatably-mounted motor elements, an accelerating and retarding engine associated with each motor element, whereby said motor is adapted to absorb a practically constant amount of power from said transmission-line, and means for storing energy accumulated in the operation of said vehicle, said engines being adapted to utilize said accumulated energy to start the motor, and said engines being also adapted to operate said vehicle independently of the said motor, substantially as described.

20. In a traction system, the combination with a transmission-line, of a vehicle, a motor mounted upon said vehicle for causing a propulsion thereof, equalizing means associated with said motor, whereby said motor is adapted to absorb a practically constant amount of energy from said transmission-line, said equalizing means being adapted to absorb the power accumulated in the operation of the vehicle, electromagnetic means for controlling the circuit connections of the said motor, electromagnetic means for controlling the operation of the said equalizing means, and a controller for controlling the actuation of said electromagnetic means, substantially as described.

21. In a traction system, the combination with a transmission-line, of a vehicle adapted for operation in said traction system, an electric motor mounted upon said vehicle, electromagnetic means for controlling the circuit connections of said motor, electromagnetic means for effecting operative association of said motor to propel said vehicle, equalizing means associated with said motor, whereby said motor when operating is adapted to absorb a constant amount of power from said transmission-line, electromagnetic means for controlling said equalizing means, and a controller for effecting the operation of said electromagnetic means for changing the speed of operation of said vehicle, substantially as described.

22. In a traction system, the combination with a transmission-line, of a vehicle adapted for operation in said traction system, an electric motor mounted upon said vehicle, electromagnetic means for controlling the circuit connections of said motor, electromagnetic means for effecting operative association of said motor to propel said vehicle, equalizing means associated with said motor whereby said motor when operating is adapted to absorb a constant amount of power from said transmission-line, electromagnetic means for controlling said equalizing means, a controller for effecting the operation of said electromagnetic means for changing the speed of operation of said vehicle, and a reversing-switch interposed between said controller and said electromagnetic means, substantially as described.

23. In a traction system, the combination with a transmission-line, of a vehicle adapted for operation in said traction system, an electric motor mounted upon said vehicle, electromagnetic means for controlling the circuit connections of said motor, electromagnetic means for effecting the operative association of said motor to cause the propulsion of said vehicle, equalizing means associated with said motor, whereby said motor when operating is adapted to absorb a constant amount of power from said transmission-line, electromagnetic means for controlling said equalizing means, a reversing-switch at each end of said vehicle provided with segments having electrical connection with said electromagnetic means, the circuit connections for the "forward" and "backward" running positions being reversed in the two switches, and a controller adapted to close circuit through the reversing-switch segments to effect an operation of the electromagnetic means, substantially as described.

24. In a traction system, the combination with a transmission-line, of a vehicle adapted for operation in said system, a motor provided with two rotatable members mounted upon said vehicle, an accelerating and retarding engine associated with each motor member, electromagnetic means for controlling the circuit connections of said motor, electromagnetic means for operatively associating either motor member to cause a propulsion of the vehicle, a reversing-switch provided with segments having electrical connection with said electromagnetic means, a source of power for operating said electromagnetic means, and a controller for closing the circuit connections through said reversing-switch segments, substantially as described.

25. In a traction system, the combination with a transmission-line, of a vehicle for operating in said system, an electric motor mounted upon said vehicle provided with two rotatable members, equalizing means associated with said motor whereby said motor is adapted when operating to absorb a practically constant amount of power from said transmission-line, electromagnetic means for controlling the circuit connections of said electric motor, electromagnetic means for controlling the operation of said equalizing means, electromagnetic means for operatively associating either motor element to propel the vehicle, a source of power for energizing said electromagnetic means, a reversing-switch provided with segments having electrical connection with said electromagnetic means, a controller for closing the circuit through segments of said reversing-switch, and means for storing energy accumulated in the operation of said vehicle, substantially as described.

26. In a traction system, the combination with a transmission-line, of a vehicle adapted for operation within said system, an electric motor comprising two rotatably-mounted motor members, equalizing means associated with said motor whereby said motor is adapted when operating to absorb a practically constant amount of power from said transmission-line, storing means for storing energy accumulated in the operation of the vehicle, electromagnetic means for controlling the circuit through said motor, electromagnetic means for controlling the operation of said equalizing means, a reversing-switch at each end of said vehicle provided with segments having electrical connection with said electromagnetic means, circuit connections for "forward" and "backward" operating positions of said vehicle being reversed in the two switches, and a controller associated with each reversing-switch for effecting circuit connection between segments thereof, substantially as described.

27. In a traction system, the combination with a transmission-line, of vehicles adapted for operation within said system, electric motors mounted upon a plurality of said vehicles, equalizing means associated with each motor whereby said motors are adapted when operating to consume a practically constant amount of power from said transmission-line, electromagnetic means for controlling the circuit connections of said motors, electromagnetic means for controlling the operation of said equalizing means, controlling means provided at each extremity of said vehicles having electrical connection with said electromagnetic means, the circuit connections for the "forward" and "backward" running positions of the two controlling means on each car being reversed, a train-circuit extending the length of the said train and adapted to effect electrical connection between the various controlling means, whereby the controlling means upon either car is adapted to operate the driving mechanism of each vehicle, and electric couplings included within said train-circuit for effecting electrical connection of said circuit between the various cars, substantially as described.

28. In a traction system, the combination with a transmission-line, of vehicles adapted for operation within said system, electric motors mounted upon a plurality of said vehicles, equalizing means associated with each motor whereby said motors are adapted when operating to consume a practically constant amount of power from said transmission-line, electromagnetic means for controlling the circuit connections of said motors, electromagnetic means for controlling the operation of said equalizing means, controlling means provided at each extremity of said vehicles having electrical connection with said electromagnetic means, the circuit connections for the "forward" and "backward" running positions of the two controlling means on each car being reversed, a train-circuit extending the length of the said train and adapted to effect electrical connection between the various controlling means, whereby the controlling means upon either car is adapted to operate the driving mechanism of each vehicle, and an electric coupling provided upon the extremity of each vehicle, said couplings carrying the terminals of the various controlling-circuits, the terminals associated with the circuits for controlling the "forward" running position of one controller being adapted to engage the terminals of the circuits controlling the "backward" operation of the adjacent vehicle, substantially as described.

29. In a system of electrical distribution, the combination with a transmission-line, of a motor adapted to receive its power from said transmission-line, said motor being provided with two motor members adapted to rotate in opposite directions, and an engine associated with one of said motor members to rotate the same, whereby the motor may be brought to speed, substantially as described.

30. The combination with an electric motor provided with two motor members adapted to rotate in opposite directions, of an engine for rotating a motor member, substantially as described.

31. The combination with an electric motor having two motor members adapted to rotate in opposite directions, of an engine associated with one of said motor members to start the same, whereby the said motor may be brought to speed, substantially as described.

32. In an electric traction system, the combination with a vehicle, of a motor upon said vehicle having two motor members adapted to rotate in opposite directions, and an engine for driving a motor member, substantially as described.

33. In an electric traction system, the combination with a vehicle, of a motor mounted upon said vehicle having motor members adapted to rotate in opposite directions, and engines for driving said motor members in opposite directions, substantially as described.

34. The combination with a motor having two motor members adapted to rotate in opposite directions, of an accelerating and retarding engine associated with a motor member, substantially as described.

35. In an electric traction system, the combination with a plurality of vehicles, of motors mounted upon said vehicles, said motors being provided with members adapted to rotate in opposite directions, and means associated with said motors for absorbing surplus power developed thereby, whereby the motors are adapted to consume a practically uniform amount of power, substantially as described.

36. In an electric traction system, the combination with a train comprising a plurality of vehicles, of motors mounted upon said vehicles for causing a propulsion thereof, an accelerating and retarding engine associated with each motor for consuming surplus power developed in the operation of its associated motor and for utilizing said power to aid the motors in the propulsion of the vehicles, whereby a uniform amount of energy is consumed by the said motors, substantially as described.

37. In a traction system, the combination with a vehicle, of a motor mounted upon said vehicle for causing a propulsion thereof, said motor having motor members adapted to rotate at relatively constant speed, and an engine for changing the speed of one of said motor members, substantially as described.

38. In a traction system, the combination with a vehicle, of a motor mounted upon said vehicle for effecting a propulsion thereof, an accelerating and retarding engine associated with said motor, electromagnetic means for controlling the operation of the said motor, electromagnetic means for causing the operation of said engine, controlling means for effecting an operation of the said electromagnetic means, and switching mechanism interposed between the said electromagnetic means and the controlling means, for varying the electrical interconnections between the said controlling means and the said electromagnetic means, said switching mechanism being adapted independently of the controlling means to effect an operation of the engine to start the motor, substantially as described.

39. In an electric traction system, the combination with a vehicle, of a motor mounted upon said vehicle having motor members adapted to rotate in opposite directions, an accelerating and retarding engine associated with said motor to compensate for changes of load in the operation of the said vehicle, a plurality of electromagnetic means for causing changes in the operation of the said motor and the said engine, and controlling means effecting an energization of said electromagnetic means, substantially as described.

40. In an electric traction system, the combination with a vehicle, of a motor mounted upon said vehicle having motor members adapted to rotate in opposite directions, an accelerating and retarding engine associated with said motor to compensate for changes of load in the operation of the said vehicle, a plurality of electromagnetic means for causing changes in the operation of the said motor and the said engine, controlling means for effecting an energization of said electromagnetic means, and switching mechanism interposed between the said electromagnetic means and the said controlling means for changing the electrical interconnections between the same, said switching mechanism being adapted independently of the said controlling means to cause an operation of the said engine to start the motor, substantially as described.

41. In a traction system, the combination with a vehicle, of a motor mounted upon said vehicle, said motor being provided with two motor elements adapted to rotate in opposite directions, means for operatively associating a motor element with the vehicle to cause a propulsion thereof, means for operatively associating the remaining motor element with the vehicle to cause a propulsion thereof in the reverse direction, and retarding means adapted for association with either motor element, substantially as described.

42. In an electric traction system, the combination with a vehicle, of a motor upon said vehicle having two motor elements adapted to rotate in opposite directions, an accelerating and retarding engine associated with each motor element, means for operatively associating one motor element with the vehicle to cause a propulsion thereof, and means for operatively associating the remaining motor element with the vehicle to cause a propulsion thereof in the opposite direction, substantially as described.

43. The combination with a motor having two rotatable members, of an engine adapted to be coupled with one of the members, means whereby the motor may operate the engine to accumulate power, and means whereby the power may be supplied to the engine to actuate the same, substantially as described.

44. The combination with a motor having two rotatable members, of two engines each adapted for connection with a motor member, means operated by the engines for accumulating power, and means whereby the said power may be supplied to the engines to effect their operation, substantially as described.

45. The combination with a motor having two rotatable members, of an engine adapted to be coupled with one of the members, means whereby the motor may operate the engine to accumulate power, means whereby this power may be supplied to the engine to actuate the same, and electromagnetic controlling means for causing the engine to act as an accumulator of power and controlling the supply of this power to the engine, substantially as described.

46. The combination with a motor having two rotatable members, of two engines each adapted for connection with a motor member, means operated by the engines for accumulating this power, means whereby the said power may be supplied to the engines to effect their operation, and electromagnetic controlling means for causing the engines to act as accumulators of power and controlling the supply of this power to the engines, substantially as described.

47. The combination with a vehicle, of a motor having two rotating members for propelling the same, an engine adapted for connection with one of the said members, means whereby the motor may operate the engine to accumulate power, and means whereby the said power may be used in the operation of the engine, substantially as described.

48. The combination with a vehicle, of a motor having two rotating members for propelling the same, an engine for, and adapted to be connected with, each motor member, means whereby the motor may operate the engines to accumulate power, and means whereby the said power may be used in the operation of the engines, substantially as described.

49. The combination with a vehicle, of a motor having two rotatable members for propelling the same, an engine for, and adapted to be connected with, each motor member, means whereby the motor may operate an engine to accumulate power, and means whereby the accumulated power may be employed in operating an engine, substantially as described.

50. The combination with a vehicle, of a motor having two rotatable members for propelling the same, an engine for, and adapted to be connected with, each motor member, means whereby the motor may operate an engine to accumulate power, means whereby the accumulated power may be employed in operating an engine, and means whereby one of the engines may operate the vehicle independently of the motor, substantially as described.

51. In a traction system, the combination with a vehicle, of a traction-motor thereon having two members, both rotatable with reference to an operating-shaft of the vehicle's running-gear, and means for engaging each motor member with the shaft to operate the vehicle, substantially as described.

52. In a traction system, the combination with a vehicle, of a traction-motor thereon, having two members rotatable with respect to each other and to a point in space, means for separably connecting one of the motor members in driving engagment with the rotatable element of the vehicle running-gear, and means for separably connecting the other motor member with the rotating element of the vehicle running-gear, each of said motor members being thereby adapted, when desired, to rotate with respect to the driving element of the vehicle running-gear associated therewith, substantially as described.

53. In a traction system, the combination with a vehicle, of a traction-motor thereon, having two members rotatable with respect to each other and to a point in space, means for separably connecting one of the motor members in driving engagement with the rotatable element of the vehicle running-gear, and a compressor in operative relation with the other motor member, substantially as described.

54. In a traction system, the combination with a vehicle, of a traction-motor thereon, having two members rotatable with respect to each other and to a point in space, an engine in engagement with one of the motor members, and means for separably connecting the other motor member with the vehicle running-gear, substantially as described.

55. In a traction system, the combination with a vehicle, of a motor having two members rotatable with respect to each other and to a point in space, one of the said members being for engagement with a shaft of the vehicle running-gear, and an engine in engagement with the other motor member, substantially as described.

56. In a traction system, the combination with a vehicle, of a motor having two members rotatable with respect to each other and to a point in space, one of the said members being for engagement with a shaft of the vehicle running-gear, and a compressor in engagement with the other motor member, substantially as described.

57. In a traction system, the combination with a vehicle, of a traction-motor thereon, having two members rotatable with respect to each other and to a point in space, means for separably connecting one of the motor means in driving engagement with the rotatable element of the vehicle running-gear, a compressor in operative relation with the other motor member, means for storing power accumulated by the compressor, and means whereby the said power may be used in aiding in the operation of the vehicle, substantially as described.

58. In a traction system, the combination with a vehicle, of a motor having two members rotatable with respect to each other and to a point in space, one of the said members being for engagement with a shaft of the vehicle running-gear, a compressor in engagement with the other motor member, means for storing power accumulated by the compressor, and means whereby the said power may be used in aiding in the operation of the vehicle, substantially as described.

59. In a traction system, the combination with a vehicle, of a traction-motor thereon having two members rotatable with respect to each other and with respect to a point in space, means for separably engaging either motor member with the vehicle running-gear, and retarding means accumulating energy in checking the speed of the vehicle and adapted for operation by a motor member, substantially as described.

60. In a traction system, the combination with a vehicle, of a traction-motor thereon having two members rotatable with respect to each other and with respect to a point in space, means for separably engaging either motor member with the vehicle running-gear, and retarding means associated with each motor member for storing energy accumulated in checking the speed of the vehicle, substantially as described.

61. In a traction system, the combination with a vehicle, of a traction-motor thereon having two members rotatable with respect to each other and with respect to a point in space, means for separably engaging either motor member with the vehicle running-gear, retarding means accumulating energy in checking the speed of the vehicle and adapted for operation by a motor member, and means for using the accumulated energy in aid of the vehicle's operation, substantially as described.

62. In a traction system, the combination with a vehicle, of a traction-motor thereon having two members rotatable with respect to each other and with respect to a point in space, means for separably engaging either motor member with the vehicle running-gear, retarding means associated with each motor member for storing energy accumulated in checking the speed of the vehicle, and means for using the accumulated energy in aid of the vehicle's operation, substantially as described.

63. In a traction system, the combination with a vehicle, of a motor having two relatively rotatable members, and a compressor for operation by one member of the motor, the other member of the motor being adapted for engagement with the vehicle running-gear, substantially as described.

64. In a traction system, the combination with a vehicle, of a motor having two relatively rotatable members, and an engine for operating one member of the motor, the other member of the motor being adapted for engagement with the vehicle running-gear, substantially as described.

65. In a traction system, the combination with a vehicle, of a motor having two relatively rotatable members, a compressor for operation by one member of the motor, the other member of the motor being adapted for engagement with the vehicle running-gear, and means for storing the energy accumulated by the compressor, substantially as described.

66. In a traction system, the combination with a vehicle, of a motor having two relatively rotatable members, a compressor for operation by one member of the motor, the other member of the motor being adapted for engagement with the vehicle running-gear, means for storing the energy accumulated by the compressor, and means whereby the accumulated energy may be used to operate the compressor as an engine to operate that element of the motor that previously operated the engine as a compressor, substantially as described.

67. In a traction system, the combination with a vehicle, of a traction-motor thereon having two members rotatable with respect to each other and to a point in space, clutching mechanism for associating either motor member with an operating-shaft of the vehicle, and an engine for operating the motor member, substantially as described.

68. In a traction system, the combination with a vehicle, of a traction-motor thereon having two members rotatable with respect to each other and to a point in space, clutching mechanism for associating either motor member with an operating-shaft of the vehicle, and a compressor for operation by a motor member, substantially as described.

69. In a traction system, the combination with a vehicle, of a traction-motor thereon having two members rotatable with respect to each other and to a point in space, clutching mechanism for associating either motor member with an operating-shaft of the vehicle, two engines, one for operative association with each motor member, and means whereby each engine may act as a compressor or an accelerator, as desired, substantially as described.

70. In a traction system, the combination with a vehicle, of a traction-motor thereon having two members rotatable with respect to each other and to a point in space, clutching mechanism for associating either motor member with an operating-shaft of the vehicle, two engines, one for operative association with each motor member, means whereby each engine may act as a compressor or an accelerator, as desired, means for storing power accumulated by the engines when acting as compressors, and means whereby this power may be utilized in the operation of the engines when used as accelerators, substantially as described.

71. In a traction system, the combination with a vehicle, of a traction-motor thereon having two members rotatable with respect to each other and to a point in space, clutching mechanism for associating either motor member with an operating-shaft of the vehicle, a compressor for operation by a motor member, means for storing power accumulated by the compressor when the speed of the vehicle is checked, and means whereby this power may be used in operating the compressor as an engine to act in the propulsion of the vehicle, substantially as described.

72. In a traction system, the combination with a vehicle, of a traction-motor thereon having two members rotatable with respect to each other and to a point in space, clutching mechanism for associating either motor member with an operating-shaft of the vehicle's running-gear, and two engines, one adapted for operative association with each motor member, substantially as described.

73. In a traction system, the combination with a vehicle, of a traction-motor thereon having two members adapted for rotation relatively and with respect to a point in space, means for associating either element of the motor with the vehicle's running-gear, and retarding means operated by a motor member in checking the speed of the vehicle to accumulate power, substantially as described.

74. In a traction system, the combination with a vehicle, of a traction-motor thereon having two members adapted for rotation relatively and with respect to a point in space, means for associating either element of the motor with the vehicle's running-gear, retarding means operated by a motor member in checking the speed of the vehicle to accumulate power, and means whereby the said power may be used in aid of the vehicle's operation, substantially as described.

75. In a traction system, the combination with a vehicle, of a traction-motor thereon having two members adapted for rotation relatively and with respect to a point in space, means for associating either element of the motor with the vehicle's running-gear, and two retarding agencies, one for association with each motor member, and one or the other adapted to be operated by its associated motor member in checking the speed of the vehicle to accumulate power, substantially as described.

76. In a traction system, the combination with a vehicle, of a traction-motor thereon having two members adapted for rotation relatively and with respect to a point in space, means for associating either element of the motor with the vehicle's running-gear, two retarding agencies, one for association with each motor member and one or the other adapted to be operated by its associated motor member in checking the speed of the vehicle to accumulate power, and means whereby the accumulated power may be employed in aid of the vehicle's operation, substantially as described.

77. In a traction system, the combination with a motor-vehicle, of a traction-motor having two members rotatable with respect to each other and to a point in space, means whereby either motor member may be operatively associated with the vehicle's running-gear, a retarding-engine for association with a motor member to accumulate power in checking the speed of the vehicle, and means whereby the accumulated power may be employed in operating the engine in aid of the vehicle's operation, substantially as described.

78. In a traction system, the combination with a motor-vehicle, of a traction-motor having two members rotatable with respect to each other and to a point in space, means whereby either motor member may be operatively associated with the vehicle's running-gear to accumulate power in checking the speed of the vehicle, two retarding-engines, one adapted for association with each motor member to accumulate power in checking the speed of the vehicle, and means whereby the accumulated power may be employed in operating the engines in aid of the vehicle's operation, substantially as described.

79. In a traction system, the combination with a vehicle, of a traction-motor thereon having two members rotatable with respect to each other and with respect to a point in space, means whereby either motor member may be operatively associated with the vehicle's running-gear, means operated by one of the motor members in checking the speed of the vehicle to accumulate power, and means whereby this power may be used in aid of the vehicle's operation, substantially as described.

80. In a traction system, the combination with a transmission-line for supplying power to said system extending along the line of travel, of a vehicle, an electric motor mounted upon said vehicle for causing a propulsion thereof, and equalizing means associated with said motor, whereby said motor when operating is adapted to absorb a practically constant amount of power from said transmission-line, substantially as described.

81. In a traction system, the combination with a transmission-line for supplying power to said system extending along the line of travel, of a vehicle, an electric motor for causing propulsion thereof, said motor being adapted normally to operate at a practically constant speed, means for accumulating energy operated by the motor, and means whereby the energy may be employed in aid to the operation of the vehicle, the said motor and the means for accumulating energy serving to absorb a practically constant amount of power from said transmission-line, substantially as described.

82. In a traction system, the combination with a transmission-line for supplying power to said system extending along the line of travel, of a vehicle, an electric motor for causing propulsion thereof, means for accumulating energy operated by the motor, and means whereby the energy may be employed in aid to the operation of the vehicle, the said motor and the means for accumulating energy serving to absorb a practically constant amount of power from said transmission-line, substantially as described.

In witness whereof I hereunto subscribe my name this 19th day of April, A. D. 1901.

BION J. ARNOLD.

Witnesses:
GEORGE L. CRAGG,
MAX W. ZABEL.